United States Patent Office
3,573,282
Patented Mar. 30, 1971

3,573,282
4H-[1,3]OXAZINO[3,2-d][1,4]BENZODIAZEPINE-4,7(6H)-DIONES
Jacob Szmuszkovicz, Kalamazoo, Mich., assignor to The Upjohn Company, Kalamazoo, Mich.
No Drawing. Continuation-in-part of application Ser. No. 760,963, Sept. 19, 1968. This application Mar. 27, 1969, Ser. No. 811,224
Int. Cl. C07d 53/06, 87/20, 87/54
U.S. Cl. 260—239.3
25 Claims

ABSTRACT OF THE DISCLOSURE

Oxazinobenzodiazepines of the Formula II:

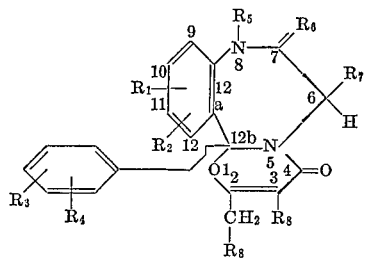

wherein $R_1$, $R_2$, $R_3$ and $R_4$ are hydrogen, lower-alkyl, lower-alkoxy, halogen, —$CF_3$, —$NO_2$ or —CN, wherein $R_5$ is hydrogen, lower-alkyl or benzyl, wherein $R_6$ is oxygen or sulfur, wherein $R_7$ is hydrogen, lower-alkyl or lower-alkoxy, and wherein $R_8$ is hydrogen, lower-alkyl or phenyl, are prepared by reacting 5-phenyl-3H-1,4-benzodiazepin-2(1H)-ones of Formula I:

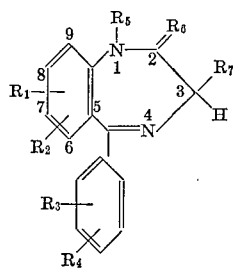

wherein $R_1$, $R_2$, $R_3$, $R_4$, $R_5$, $R_6$ and $R_7$ are defined as above, with an acyl halide in the presence of a base or with a diketene. The new products are essentially sedatives and tranquilizers useful for treatment of mammals.

CROSS REFERENCE TO RELATED APPLICATION

This application is a continuation-in-part of application Ser. No. 760,963, filed Sept. 19, 1968 and now abandoned.

BACKGROUND OF THE INVENTION

Field of the invention

The present invention is concerned with new organic compounds and more particularly with novel oxazinobenzodiazepines and a process for the production thereof.

SUMMARY OF THE INVENTION

The novel compounds and the process of production thereof can be illustratively represented by the following formulae:

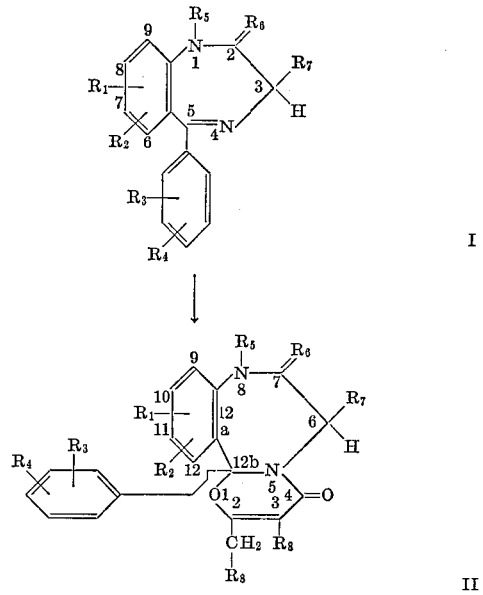

wherein $R_1$, $R_2$, $R_3$ and $R_4$ are selected from the group consisting of hydrogen, alkyl and alkoxy of 1 to 6 carbon atoms, inclusive, halogen, —$CF_3$, —$NO_2$ and —CN; wherein $R_5$ is selected from the group consisting of hydrogen, alkyl defined as above, and benzyl; wherein $R_6$ is selected from the group consisting of =O and =S; wherein $R_7$ is selected from the group consisting of hydrogen, alkyl defined as above, and alkoxy as defined above; and wherein $R_8$ is selected from the group consisting of hydrogen, alkyl defined as above, and phenyl.

DESCRIPTION OF THE PREFERRED EMBODIMENT

Examples of alkyl of 1 to 6 carbon atoms, inclusive, are methyl, ethyl, propyl, isopropyl, butyl, isobutyl, tert.-butyl, pentyl, 2-methylbutyl, neopentyl, hexyl, 2-methylpentyl, 3-methylpentyl, and the like.

Examples of alkoxy of 1 to 6 carbon atoms, inclusive, are methoxy, ethoxy, propoxy, isopropoxy, butoxy, sec.-butoxy, pentyloxy, hexyloxy, and the like.

Halogen herein defined consists of fluorine, chlorine, bromine and iodine.

The process of this invention comprises: treating a selected 5-phenyl-3H-1,4-benzodiazepin-2(1H)-one of Formula I with a diketene, either by direct addition or produced in situ, i.e., by the addition of acyl halides, e.g., acyl chloride, acyl bromide or less desirably, acyl iodide and a strong base, e.g., triethylamine. In general, higher yields are obtained by the acyl halide and base method.

The novel compounds of Formula II have anti-convulsive, anti-anxiety and tranquilizing properties. Illustratively, in mice, 2 mg./kg. of 11-chloro-8,12b-dihydro-2,8-dimethyl - 12b - phenyl - 4H - [1,3]oxazino[3,2-d][1,4]benzodiazepine-4,7(6H)-dione IIa (II in which $R_1$, $R_3$, $R_4$, $R_7$ and $R_8$ are hydrogen; $R_2$ is chlorine at $C_{11}$; $R_6$ is oxygen; and $R_5$ is methyl):

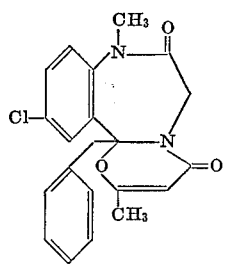

IIa protects the mice from convulsions induced by administration of 85 m./kg. pentylene tetrazole. Monkeys at a dosage of 10 mg./kg. of IIa have sharply decreased wakefulness. Cats at a dosage of 1.6 mg./kg. of IIa have incoordinated muscular movement (ataxia) and at a dosage of 2 mg./kg. of IIa are completely relaxed.

The novel compounds II in dosages of 0.5 to 20 mg./kg. act as good tranquilizers, sedatives and anti-convulsants and can be used in birds and mammals when needed, e.g., for minor veterinary operations, tranquilization during transport of animals by airplane, ship, train, truck and so on. Administration to cattle, horses, dogs, cats, or the like, or zoo animals on long voyages, in a quantity between 0.5 to 20 mg./kg. of body weight produces sedation and tranquilization and thereby reduces losses of valuable animals due to anxiety, over-excitement and fighting among the caged animals.

The novel compounds of Formula II can be administered to mammals and birds by both oral and parenteral routes in order to produce their pharmacological effects. For oral administration, unit dosage forms such as tablets, capulses, powders, granules, syrups, elixirs and the like containing the appropriate amount for treatment are used. For tablets, common pharmaceutical carriers such as starch, lactose, kaolin, dicalcium, phosphate and the like are employed. Powders may also be used in gelatin capsules with or without carriers such as methylcellulose, magnesium stearate, calcium stearate, talc and the like. For fluid preparations, these compounds may be dissolved or suspended in aqueous alcoholic vehicles with or without buffering agents and with flavoring mixtures.

Starting materials of Formula I and the preparation thereof are disclosed particularly in U.S. Patents 3,371,085 and 3,296,249, and in L. H. Sternbach et al., "Drugs Affecting the Central Nervous System," Medicinal Research Series, vol. 2, chapter 6, pp. 237-264, 1968, Dekker. Representative starting materials comprise:

5-phenyl-3H-1,4-benzodiazepin-2(1H)-one;
7-chloro-5-phenyl-3H-1,4-benzodiazepin-2(1H)-one;
7-chloro-1-methyl-5-phenyl-3H-1,4-benzodiazepin-2(1H)-one;
7-bromo-5-phenyl-3H-1,4-benzodiazepin-2(1H)-one;
7,8-dimethyl-5-phenyl-3H-1,4-benzodiazepin-2(1H)-one;
7-chloro-5-(p-chlorophenyl)-3H-1,4-benzodiazepin-2(1H)-one;
7,9-dimethyl-5-phenyl-3H-1,4-benzodiazepin-2(1H)-one;
7,9-dichloro-5-phenyl-3H-1,4-benzodiazepin-2(1H)-one;
7-bromo-5-(p-tolyl)-3H-1,4-benzodiazepin-2(1H)-one;
7-chloro-3-methyl-5-phenyl-3H-1,4-benzodiazepin-2(1H)-one;
6-chloro-1-methyl-5-phenyl-3H-1,4-benzodiazepin-2(1H)-one;
5-(p-chlorophenyl)-3H-1,4-benzodiazepin-2(1H)-one;
6-chloro-5-phenyl-3H-1,4-benzodiazepin-2(1H)-one;
9-chloro-5-phenyl-3H-1,4-benzodiazepin-2(1H)-one;
7-hexyl-5-phenyl-3H-1,4-benzodiazepin-2(1H)-one;
8-chloro-5-phenyl-3H-1,4-benzodiazepin-2(1H)-one;
7-chloro-5-(m-fluorophenyl)-3H-1,4-benzodiazepin-2(1H)-one;
1-benzyl-7-chloro-5-phenyl-3H-1,4-benzodiazepin-2(1H)-one;
7-chloro-5-phenyl-3-methoxy-3H-1,4-benzodiazepin-2(1H)-one;
7-chloro-1-ethyl-5-phenyl-3H-1,4-benzodiazepin-2(1H)-one;
9-methyl-5-phenyl-3H-1,4-benzodiazepin-2(1H)-one;
7-chloro-5-(p-fluorophenyl)-3H-1,4-benzodiazepin-2(1H)-one;
7-chloro-5-phenyl-3-methoxymethyl-1,4-benzodiazepin-2(1H)-one;
7-chloro-5-(m-tolyl)-3H-1,4-benzodiazepin-2(1H)-one;
7-fluoro-1-methyl-5-phenyl-3H-1,4-benzodiazepin-2(1H)-one;
7-chloro-1-methyl-5-(p-chlorophenyl)-3H-1,4-benzodiazepin-2(1H)-one;
7-chloro-3-butoxy-5-phenyl-3H-1,4-benzodiazepin-2(1H)-one;
7-chloro-3-pentyloxy-5-(m-tolyl)-3H-1,4-benzodiazepin-2(1H)-one;
7-chloro-3-hexyloxy-5-(p-trifluoromethylphenyl)-3H-1,4-benzodiazepin-2(1H)-one;
7-chloro-3-ethoxy-5-(p-methoxyphenyl)-3H-1,4-benzodiazepin-2(1H)-one;
7-bromo-3-methoxy-5-(p-chlorophenyl)-3H-1,4-benzodiazepin-2(1H)-one;
7-chloro-5-(m-methoxyphenyl)-3H-1,4-benzodiazepin-2(1H)-one;
7-nitro-5-phenyl-3H-1,4-benzodiazepin-2(1H)-one;
7-cyano-5-phenyl-3H-1,4-benzodiazepin-2(1H)-one;
7-butoxy-1-benzyl-5-(p-hexyloxyphenyl)-3H-1,4-benzodiazepin-2(1H)-one;
7-trifluoromethyl-5-phenyl-3H-1,4-benzodiazepin-2(1H)-one;
7-nitro-1-isopentyl-5-phenyl-3H-1,4-benzodiazepin-2(1H)-one;
7-nitro-1-methyl-3-propoxy-5-phenyl-3H-1,4-benzodiazepin-2(1H)-one;
7-chloro-5-phenyl-3H-1,4-benzodiazepin-2(1H)-thione;
7-chloro-1methyl-5-phenyl-3H-1,4-benzodiazepin-2(1H)-thione;
7-cyano-1-methyl-5-phenyl-3H-1,4-benzodiazepin-2(1H)-one;
7-isopropoxy-1-benzyl-5-phenyl-3H-1,4-benzodiazepin-2(1H)-one;
7-chloro-1-benzyl-3-methoxy-5-phenyl-3H-1,4-benzodiazepin-2(1H)-one, and the like.

In carrying out the process of this invention by the acyl halide method, a selected 5-phenyl-3H-1,4-benzodiazepin-2(1H)-one of Formula I in an inert organic solvent is treated with a selected acyl halide in the presence of a base capable of accepting hydrogen halide. As an inert organic solvent ether (preferred), tetrahydrofuran, methylene chloride, chloroform and the like is used. As a base, organic bases, soluble in the selected solvent, are preferably used, e.g., triethylamine, tributylamine, 1-methylpiperidine or the like. However, inorganic bases, e.g., zinc oxide, barium oxide can also be used. The reaction is generally carried out between 0 and 35° C., usually at about room temperature (24–26° C.) or slightly below, at 18–20° C. The time to complete the reaction is between 10 and 30 hours. As acyl halides, the bromides and chlorides of alkanoic acids of 2 to 8 carbon atoms, inclusive, and also phenyl-substituted alkanoic acids of 8 to 10 carbon atoms, inclusive, are used providing that these acyl chlorides or bromides have at least two hydrogen atoms at the 2-position in order to be able to form a diketene, thus:

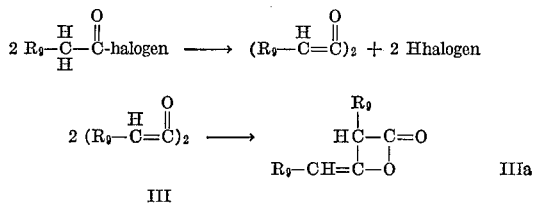

wherein $R_9$ is selected from the group consisting of hydrogen, alkyl of 1 to 6 carbon atoms, inclusive, and phenyl. Such acyl halides include the chlorides and bromides of acetyl, phenylacetyl, propionyl, butyryl, valeryl, hexanoyl, heptanoyl, isovaleryl, 3-phenylpropionyl and the like. In the preferred embodiment of this invention, to achieve high yields, the molar ratio of Formula I 5-phenyl-3H-benzodiazepin-2(1H)-one to acyl halide to organic base ranges from 1:10:20 to 1:30:60.

After the reaction is terminated the obtained oxazinobenzodiazepine is isolated and purified by conventional methods such as extraction, evaporation, trituration, chromatography and crystallization, and the like.

In carrying out the method using a diketene as described above, as reactant, the selected 5-phenyl-3H-1,4-benzodiazepin-2(1H)-one is refluxed with an excess of the diketene in an inert organic solvent, for example, acetone, benzene, chloroform, and the like. The diketene is defined by Formula III or IIIa above. In the preferred embodiment of this invention, the diketene is used in an excess of 5–15 molar equivalents compared to 1 molar equivalent of the Formula I benzodiazepin-2(1H)-one selected. The reaction is generally carried out at the reflux temperature of the mixture during a period of 1 to 10 hours. The product is isolated and purified by conventional procedures such as extraction, chromatography, trituration, crystallization and recrystallization, and the like.

The following examples are illustrative of the process and product of the present invention, but are not to be construed as limiting.

EXAMPLE 1

*11-chloro-8,12b-dihydro-2,8-dimethyl - 12b - phenyl - 4H-[1,3]oxazino[3,2 - d][1,4]benzodiazepine - 4,7(6H)-dione*

A solution of 78.5 g. (1 mole) of acetyl chloride in 400 ml. of ether was added over a period of 45 minutes to a solution of 7-chloro-1-methyl-5-phenyl-3H - 1,4 - benzodiazepin-2(1H)-one (28.4 g.; 0.1 mole) and 200 g. (2 moles) of triethylamine in 2 l. of ether while keeping the temperature at 20° C. The mixture was then stirred at room temperature (about 23–25° C.) for a period of 18 hours. It was cooled in ice and 800 ml. each of water and methylene chloride was added. The organic layer was separated and the aqueous layer was extracted once with ether, and the ether washings combined with the organic layer. The total organic extracts were washed twice with water and then with saturated sodium chloride solution, dried over anhydrous magnesium sulfate and evaporated at 40° C. in vacuo. The resulting yellow solid was washed with water and then triturated with 50 ml. of ice-cold methanol, filtered, washed with two 20-ml. portions of ice-cold methanol, followed by 100 ml. of ether, to give an almost colorless solid (33.3 g.). A 31-g. portion of this solid was recrystallized from 180 ml. of chloroform and 600 ml. of ether to give 22 g. of 11-chloro-8,12b-dihydro - 2,8-dimethyl-12b-phenyl-4H-[1,3]oxazino[3,2-d]-[1,4]benzodiazepine - 4,7(6H) - dione of melting point 182–183.5° C.( sintering at 170° C.).

U.V.: λ max. 202 (40,600); sh. 241 (18,400).

*Analysis.*—Calcd. for $C_{20}H_{17}ClN_2O_3$ (percent): C, 65.13; H, 4.65; Cl, 9.61; N, 7.60. Found (percent): C, 64.85; H, 4.62; Cl, 9.61; N, 7.58.

In the same manner given in Example 1, using 3.05 g. of acetyl bromide, 0.7 g. of 7-chloro-1-methyl-5-phenyl-3H-1,4-benzodiazepin-2(1H)-one and 5 g. of triethylamine gave 0.4 g. of 11-chloro-8,12b-dihydro-2,8-dimethyl-12b-phenyl-4H-[1,3]oxazino[3,2-d][1,4]benzodiazepine - 4,7-(6H)-dione, identical with the product of Example 1.

EXAMPLE 2

*11-chloro-8,12b-dihydro-2,8-dimethyl - 12b - phenyl - 4H-[1,3]oxazino[3,2 - d][1,4]benzodiazepine - 4,7(6H)-dione*

A 0.70 g. (0.0025 mole) portion of 7-chloro-1-methyl-5-phenyl-3H-1,4-benzodiazepin-2(1H)-one was added to 5 g. of a 50% (by weight) solution of diketene in acetone and the mixture was refluxed for 18 hours. The solution was then evaporated in vacuo at 45° C. and the resulting crude product was triturated with 10 ml. of ethyl acetate and filtered to give 0.58 g. of 11-chloro-8,12b-dihydro - 2,8-dimethyl-12b-phenyl-4H-[1,3]oxazino[3,2-d]-[1,4]benzodiazepine - 4,7(6H) - dione, identical with the product of Example 1.

EXAMPLE 3

*11 - chloro - 8,12b - dihydro - 2-benzyl-3,12b-diphenyl-8-methyl-4H - [1,3]oxazino[3,2-d][1,4] - benzodiazepine-4,7(6H)-dione*

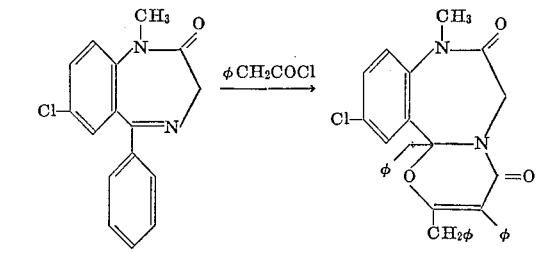

A solution of 3.85 g. (0.025 mole) of phenylacetyl chloride in 10 ml. of ether was added during 10 minutes to a solution of 7-chloro-1-methyl - 5 - phenyl - 3H - 1,4-benzodiazepin-2(1H)-one (0.7 g.; 0.0025 mole) and 5 g. (0.05 mole) of triethylamine in 50 ml. of ether, keeping the temperature between 10–15° C. The mixture was then stirred for a period of 18 hours at room temperature (about 23–25° C.), cooled in ice, and 20 ml. of water and 10 ml. of methylene chloride were added. The organic layer was separated, washed with saturated salt solution, dried over anhydrous magnesium sulfate and evaporated. The resulting residue (1.3 g.) was dissolved in 25 ml. of a mixture of 60% (volume) of ethyl acetate and 40% cyclohexane and chromatographed over 130 g. of silica gel using the same solvent mixture as eluant and collecting 150-ml. fractions. Fractions 3 and 4 were combined and evaporated, and the residue was crystallized from ether to give 0.53 g. of a precipitate in crystalline form. This precipitate was 11-chloro-8,12b-dihydro-2-benzyl-3,12b-diphenyl - 8-methyl-4H-[1,3]oxazino[3,2-d][1,4]-benzodiazepine-4,7-(6H)-dione of melting point 203–207° C.

U.V.: λ max. 244 (21,650); sh. 277 (4,550).

*Analysis.*—Calcd. for $C_{32}H_{25}ClN_2O_3$ (percent): C, 73.77; H, 4.84; Cl, 6.81; N, 5.38. Found (percent): C, 73.69; H, 4.96; Cl, 6.58; N, 5.56.

EXAMPLE 4

*11-chloro-8,12b-dihydro-2-methyl-12b-phenyl-4H-[1,3]oxazino[3,2-d][1,4]benzodiazepine-4,7(6H)-dione*

(A) 11-CHLORO-8,12b-DIHYDRO-8-BENZYL - 2 - METHYL-12b-PHENYL - 4H - [1,3]OXAZINO[3,2-d][1,4] - BENZODIAZEPINE-4,7(6H)-DIONE

In the manner given in Example 1, 1-benzyl-7-chloro-5 - phenyl - 3H-1,4-benzodiazepin-2(1H)-one was treated with acetyl chloride in the presence of triethylamine to give 11 - chloro - 8,12b - dihydro - 8-benzyl-2-methyl-12b-phenyl-4H-[1,3]oxazino[3,2-d][1,4]-benzodiazepine - 4,7-(6H)-dione.

(B) 11-CHLORO-8,12b-DIHYDRO-2-METHYL-12b-PHENYL-4H-[1,3]-OXAZINO[3,2-d][1,4] - BENZODIAZEPINE - 4,7(6H)-DIONE

The thus-obtained 11-chloro-8,12b-dihydro-8-benzyl-2-methyl-12b-phenyl-4H-[1,3]oxazino[3,2-d][1,4] - benzodiazepine-4,7(6H)-dione was dissolved in ethyl acetate and hydrogenated at 50 p.s.i. hydrogen pressure in the presence of a 10% palladium-on-charcoal catalyst for a period of 6 hours. The reaction mixture was then filtered and evaporated to give 11-chloro-8,12b-dihydro-2-methyl-12b-phenyl-4H-[1,3]oxazino[3,2-d] [1,4]-benzodiazepine-4,7-(6H)-dione.

EXAMPLE 5

*11 - chloro - 8,12b - dihydro-2,8-dimethyl-12b-(p-chlorophenyl) - 4H - [1,3]oxazino[3,2-d][1,4] - benzodiazepine-4,7-(6H)-dione*

In the manner given in Example 1, 1-methyl-7-chloro-5 - (p-chlorophenyl-3H-1,4-benzodiazepin-2(1H)-one in ether solution was treated with acetyl chloride in the presence of triethylamine to give 11-chloro-8,12b-dihydro-2,8-dimethyl - 12b-(p-chlorophenyl)-4H-[1,3]oxazino[3,2-d][1,4]benzodiazepin-4,7(6H)-dione hemihydrate of melting point 181–183° C. (effervescence; sintering 170° C.).

U.V.: λ max. 233 (26,000).

Analysis. — Calcd. for $C_{20}H_{16}Cl_2N_2O_3 \cdot 0.5H_2O$ (percent): C, 58.26; H, 4.16; Cl, 17.20; N, 6.80. Found (percent): C, 58.69; H, 4.04; Cl, 17.68; N, 6.57.

The hemihydrate was heated at 100 C. and a pressure of 15 mm. of mercury for 72 hours to obtain anhydrous 11 - chloro - 8,12b - dihydro-2,8-dimethyl-12b-(p-chlorophenyl) - 4H-[1,3]-oxazino[3,2-d][1,4]benzodiazepine-4,7(6H)-dione.

EXAMPLE 6

*11 - trifluoromethyl-8,12b-dihydro-2,8-dimethyl-12b-phenyl - 4H - [1,3]oxazino[3,2-d][1,4]-benzodiazepine-4,7(6H)-dione*

In the manner given in Example 1, 1-methyl-7-trifluoromethyl - 5 - phenyl-3H-1,4-benzodiazepin-2(1H)-one was treated with acetyl chloride in the presence of triethylamine to give 11 - trifluoromethyl-8,12b-dihydro-2,8-dimethyl - 12b - phenyl-4H-[1,3]oxazino[3,2-d][1,4]benzodiazepine - 4,7(6H)-dione of melting point 134–136° C. (effervescence).

U.V.: λ max. 203 (36,200); sh. 234 (14,750).

Analysis.—Calcd. for $C_{21}H_{17}F_3N_2O_3$ (percent): C, 62.68; H, 4.26; F, 14.17; N, 6.96. Found (percent): C, 62.61; H, 4.43; F, 13.38; N, 7.02.

EXAMPLE 7

*11 - chloro - 8,12b-dihydro-2,8-dimethyl-12b-phenyl-4H-[1,3]oxazino[3,2-d][1,4] - benzodiazepin-4(6H)-one-7-thione*

In the manner given in Example 1, 1-methyl-7-chloro-5-phenyl-3H-1,4-benzodiazepine-2(1H)-thione was treated in ether solution with acetyl chloride in the presence of triethylamine to give 11-chloro-8,12b-dihydro-2,8-dimethyl - 12b - phenyl-4H-[1,3]oxazino[3,2-d][1,4]benzodiazepin - 4(6H)-one-7-thione of melting point 197° C. (dec.).

Analysis.—Calcd. for $C_{20}H_{17}ClN_2O_2S$ (percent): C, 62.41; H, 4.45; Cl, 9.21; N, 7.28. Found (percent): C, 62.66; H, 4.53; Cl, 9.21; N, 7.32.

EXAMPLE 8

*11 - cyano - 8,12b - dihydro-2,8-dimethyl-12b-phenyl-4H-[1,3]oxazino[3,2-d][1,4]benzodiazepine-4,7(6H)-dione*

In the manner given in Example 1, 1-methyl-7-cyano-5 - phenyl - 3H - 1,4-benzodiazepin-2(1H)-one was treated in ether solution with acetyl chloride in the presence of triethylamine to give 11-cyano-8,12b-dihydro-2,8-dimethyl - 12b - phenyl - 4H - [1,3]oxazino-[3,2-d][1,4] benzodiazepine - 4,7(6H)-dione of melting point 152–154° C.

U.V.: sh. 227 (22,900); sh. 260.5 (16,900); λ max. 265 (17,400); 269.5 (16,450).

Analysis.—Calcd. for $C_{21}H_{17}N_3O_3$ (percent): C, 70.18; H, 4.77; N, 11.69. Found (percent): C, 69.99; H, 5.01; N, 11.83.

EXAMPLE 9

*11 - nitro - 8,12b - dihydro-2,8-dimethyl-12b-phenyl-4H-[1,3]oxazino[3,2 - d][1,4]benzodiazepine - 4,7(6H)-dione*

In the manner given in Example 2, 7.4 g. of 1-methyl-7 - nitro-5-phenyl-3H-1,4-benzodiazepin-2(1H)-one was treated with 100 g. of diketene at 95° C. for 19 hours to give 11 - nitro - 8,12b-dihydro-2,8-dimethyl-12b-phenyl-4H - [1,3]oxazino[3,2 - d][1,4]benzodiazepine-4,7(6H)-dione of melting point 196–198° C.

Analysis.—Calcd. for $C_{20}H_{17}N_3O_5$ (percent): C, 63.32; H, 4.52; N, 11.08. Found (percent): C, 63.05; H, 4.65; N, 11.09.

EXAMPLE 10

*11 - chloro-8,12b - dihydro-3 - ethyl-8-methyl-2-propyl-12b - phenyl - 4H-[1,3]oxazino[3,2-d][1,4]benzodiazepin-4,7(6H)-dione*

In the manner given in Example 1, 1-methyl-7-chloro-5-phenyl-3H-1,4-benzodiazepin-2(1H)-one in ether solution was treated with butyryl chloride in the presence of triethylamine to give 11-chloro-8,12b-dihydro-3-ethyl-8-methyl - 2-propyl-12b-phenyl-4H-[1,3]oxazino[3,2-d][1,4] - benzodiazepine-4,7(6H)-dione of melting point 154–157° C.

U.V.: λ max. 203 (39,450); 244 (19,350); sh. 280 (3,150).

Analysis.—Calcd. for $C_{24}H_{25}Cl_2O_3$ (percent): C, 67.83; H, 5.93; Cl, 8.34; N, 6.59. Found (percent): C, 67.88; H, 6.13; Cl, 8.07; N, 6.22.

EXAMPLE 11

*11 - chloro - 8,12b - dihydro - 2-ethyl-3,8-dimethyl-12b-phenyl - 4H-[1,3]oxazino[3,2-d][1,4]-benzodiazepine-4,7(6H)-dione*

In the manner given in Example 1, 1-methyl-7-chloro-5-phenyl-3H-1,4-benzodiazepin-2(1H)-one in ether solution was treated with propionyl chloride in the presence of triethylamine to give 11-chloro-8,12b-dihydro-2-ethyl-3,8 - dimethyl - 12b-phenyl-4H-[1,3]oxazino[3,2-d][1,4] benzodiazpine - 4,7(6H) - dione of melting point 197–201° C.

U.V.: 203 (38,550); 243 (19,050); sh. 275; sh. 285.

Analysis. — Calcd. for $C_{22}H_{21}ClN_2O_3$ (percent): C, 66.58; H, 5.33; Cl, 8.93; N, 7.06. Found (percent): C, 66.52; H, 5.41; Cl, 9.15; N, 6.60.

EXAMPLE 12

*8,12b - dihydro-2,8-dimethyl-12b-phenyl-4H-[1,3]oxazino[3,2-d][1,4]benzodiazepine-4,7(6H)-dione*

In the manner given in Example 1, 1-methyl-5-phenyl-3H - 1,4-benzodiazepin-2(1H)-one in ether solution was treated with acetyl chloride in the presence of triethylamine to give 8,12-dihydro-2,8-dimethyl-12b-phenyl-4H-[1,3]oxazino[3,2-d][1,4]benzodiazepine-4,7(6H) - dione of melting point 161–167° C. (dec.).

EXAMPLE 13

*11 - methoxy-8,12b-dihydro-2,8-dimethyl-12b-phenyl-4H-[1,3]oxazino[3,2-d][1,4]-benzodiazepine-4,7-(6H)-dione*

In the manner given in Example 1, 7-methoxy-1-methyl-5-phenyl-3H-1,4-benzodiazepin - 2(1H)-one in ether solution was treated with acetyl chloride in the presence of triethylamine to give 11-methoxy-8,12b-dihydro-2,8-dimethyl - 12b-phenyl-4H - [1,3]oxazino[3,2-d][1,4]benzodiazepine-4,7(6H)-dione.

EXAMPLE 14

*11 - bromo - 8,12b-dihydro-2,8-dimethyl-12b-phenyl-4H-[1,3]oxazino[3,2-d][1,4] - benzodiazepine - 4,7(6H)-dione*

In the manner given in Example 1, 1-methyl-7-bromo-5-phenyl-3H-1,4-benzodiazepin -2 (1H)-one was treated with acetyl chloride in the presence of triethylamine to give 11 - bromo-8,12b-dihydro-2,8-dimethyl-12b-phenyl-4H - [1,4]oxazino[3,2-d][1,4]benzodiazepin - 4,7(6H)-dione.

EXAMPLE 15

*11 - iodo - 8,12b-dihydro-2-hexyl-3-pentyl-8-methyl-12b-phenyl - 4H[1,3]oxazino[3,2 - d][1,4]benzodiazepine-4,7(6H)-dione*

In the manner given in Example 1, 1-methyl-7-iodo-5-phenyl-3H-1,4-benzodiazepin-2(1H)-one was treated with heptanoyl chloride in the presence of triethylamine to give 11 - iodo - 8,12b - dihydro-2-hexyl-3-pentyl-8-methyl-12b - phenyl - 4H-[1,3]oxazino[3,2-d][1,4]-benzodiazepine-4,7(6H)-dione.

EXAMPLE 16

*11 - fluoro - 8,12b - dihydro - 2-ethyl-3,8-dimethyl-12b-phenyl -4H - [1,3]oxazino[3,2-d][1,4]-benzodiazepine-4,7(6H)-dione*

In the manner given in Example 2, 1-methyl-7-fluoro-5-phenyl-3H-1,4-benzodiazepin - 2(1H)-one was treated with bis-(methylketene)

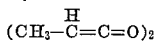

in acetone to give 11-fluoro-8,12b-dihydro-2-ethyl-3,8-dimethyl - 12b-phenyl-4H-[1,4]oxazino[3,2d][1,4]-benzodiazepine-4,7(6H)-dione.

EXAMPLE 17

*11 - chloro - 8,12b - dihydro-8-benzyl-2-methyl-12b-(3,4-dimethylphenyl) - 4h - [1,3]oxazino[3,2-d][1,4]benzodiazepine-4,7(6H)-dione*

In the manner given in Example 1, 1-benzyl-7-chloro-5-(3,4 - dimethylphenyl) - 3H-1,4-benzodiazepin-2(1H)-one was treated with acetyl chloride in the presence of triethylamine to give 11 - chloro - 8,12b-dihydro-8-benzyl-2-methyl-12b-(3,4 - dimethylphenyl) - 4H - [1,3]oxazino[3,2-d][1,4]benzodiazepine-4,7(6H)-dione.

EXAMPLE 18

*11 - chloro - 8,12b - dihydro-2,8,9 - triethyl-3-methyl-12b-(3 - bromo - 4 - butylphenyl)-4H-[1,3]oxazino[3,2-d][1,4]benzodiazepine-4,7(6H)-dione*

In the manner given in Example 1, 1,9-diethyl-7-chloro-5-(3 - bromo - 4 - butylphenyl)-3H-1,4-benzodiazepine-2 (1H)-one was treated with propionyl chloride in the presence of triethylamine to give 11-chloro-8,12b-dihydro-2,8,9-triethyl-3-methyl - 12b - (3 - bromo-4-butylphenyl)-4H - [1,3]oxazino[3,2 - d][1,4]benzodiazepine-4,7(6H)-dione.

EXAMPLE 19

*10 - chloro - 8,12b - dihydro-2-methyl-12b-(p-fluorophenyl)-4H - [1,3]oxazino[3,2-d][1,4] - benzodiazepin -4(6H)-one-7-thione*

In the manner given in Example 1, 1-benzyl-8-chloro-5-(p - fluorophenyl) - 3H - 1,4 - benzodiazepine-2(1H)-thione was treated with acetyl chloride in the presence of triethylamine to give 10-chloro-8,12b-dihydro-8-benzyl-2-methyl - 12b-(p - fluorophenyl) - 4H-[1,3]oxazino[3,2-d][1,4]-benzodiazepine-4(6H)-one-7-thione.

In the manner given in Example 4B, the thus-produced 10-chloro - 8,12b - dihydro - 8 - benzyl - 2 - methyl - 12b-(p-fluorophenyl) - 4H - [1,3]oxazino[3,2 - d][1,4]-benzodiazepin-4(6H)-one-7-thione was hydrogenated in ethyl acetate in the presence of 10% palladium-on-charcoal catalyst to give 10-chloro-8,12b-dihydro-2-methyl - 12b - (p- fluorophenyl) - 4H - [1,3]oxazino[3,2 - d][1,4]-benzodiazepin-4(6H)-one-7-thione.

EXAMPLE 20

*11 - nitro - 8,12b - dihydro - 2,8 - dimethyl-12b-(o-fluorophenyl) - 4H-[1,3]oxazino[3,2-d[]1,4]benzodiazepine-4,7(6H)-dione*

A mixture of 0.78 g. (2.5 mmoles) of 5(o-fluorophenyl) - 1,3 - dihydro - 1 - methyl-7-nitro-2H-1,4-benzodiazepin-2-one and 10 g. of diketene was heated on the steambath for 1 hour. The reaction mixture was poured on a silica gel column (100 g.) and eluted with 50% ethyl acetate-cyclohexane:

| Fraction Number: | Ml. | Product |
|---|---|---|
| 1 | 100 | |
| 2 | 50 | Diketene. |
| 3-4 | [1]25 | Do. |
| 5-7 | [1]25 | |
| 8-11 | [1]25 | 0.432 g. of starting material. |
| 12 | [1]25 | |
| 13-16 | [1]25 | 0.255 g. of desired product. |

[1] Each.

Fractions 13–16 gave 0.255 g. of 11-nitro-8,12b-dihydro-2,8-dimethyl - 12b - (o - fluorophenyl) - 4H-[1,3]oxazino[3,2 - d][1,4]benzodiazepine - 4,7(6H)-dione of melting point 199° C. (efferv.).

U.V.: sh. 225 (19,800); sh. 259 (7400); λ max. 265 (8000); 271 (8400); 301 (10,450).

*Analysis.*—Calcd. for $C_{20}H_{16}FN_3O_5$ (percent): C, 60.45; H, 4.06; F, 4.78; N, 10.58. Found (percent): C, 60.48; H, 4.45; F, 4.27; N, 10.40.

EXAMPLE 21

*11 - chloro - 8,12b - dihydro - 2-isobutyl-3-isopropyl-8-methyl - 12b - phenyl - 4H-[1,3]oxazino[3,2-d][1,4]benzodiazepine-4,7(6H)-dione*

A solution of 9 g. (0.075 mole) of isovaleryl chloride in 20 ml. of ether was added during 20 minutes to a solution of 0.7 g. (2.5 mmole) of 7-chloro-1-methyl-5-phenyl-3H-1,4-benzodiazepin-2(1H)-one and triethylamine (15 g., 0.15 mole) in 50 ml. of ether, keeping the temperature at 20° C. The mixture was stirred at room temperature overnight. It was cooled in ice, 20 ml. of water was added, the organic layer was separated and washed with water (3×25 ml.), 25 ml. of saturated salt solution, dried over anhydrous magnesium sulfate and evaporated to give a residue. The residue (5.3 g.) was chromatographed on 100 g. of silica gel using 40% ethyl acetate-cyclohexane as the eluant; 20-ml. fractions were collected. Fractions 1–6 were discarded. Fractions 7–9 were combined (0.965 g.) and rechromatographed on 100 g. of silica gel exactly as described above. Fractions 7–10 were combined to give 0.74 g. (66%) of 11-chloro-8,12b-dihydro-2-isobutyl-3 - isopropyl - 8 - methyl - 12b-phenyl-4H-[1,3]oxazino [3,2-d][1,4]benzodiazepine-4,7(6H)-dione as an oil.

U.V.: λ max. 224 (18,400); sh. 272 (4450).

*Analysis.*—Cald. for $C_{23}H_{21}ClN_2O_3$ (percent): C, 68.94; H, 6.45; Cl, 7.83; N, 6.19. Found (percent): C, 68.86; H, 6.81; Cl, 7.5; N, 6.00.

EXAMPLE 22

*11 - chloro - 8 - (cyclopropylmethyl) - 8,12b-dihydro-2-methyl-12b-phenyl - 4H - [1,3]oxazino[3,2 - d][1,4]benzodiazepine-4,7(6H)-dione*

A mixture of 0.81 g. (2.5 mmoles) of 7 - chloro-1-(cyclopropylmethyl) - 5 - phenyl - 3H-1,4-benzodiazepin-2(1H)-one and 10 g. of diketene was heated at 95° C. for 45 minutes. The solution was evaporated in vacuo, and the resulting oily solid was triturated with 10 ml. of cold methanol. The solid was filtered, washed with 2 ml. of cold methanol, then with ether (2×5 ml.) to give 0.668 g. (66%) of 11 - chloro - 8-(cyclopropylmethyl)-8,12b - dihydro - 2 - methyl - 12b-phenyl-4H-[1,3] oxazino[3,2 - d][1,4]benzodiazepine - 4,7(6H) - dione of melting point 185–186° C. (dec.), a tranquilizer like those of Formula II.

U.V.: λ max. 243 (17,150).

*Analysis.*—Calcd. for $C_{12}H_{21}ClN_2O_3$ (percent): C, 67.56; H, 5.18; Cl, 8.67; N, 6.85. Found (percent): C, 67.64; H, 5.22; Cl, 8.69; N, 6.59.

EXAMPLE 23

*11 - chloro - 8,12b - dihydro - 6 - methoxy-2,8-dimethyl-12b - phenyl - 4H - [1,3]oxazino[3,2 - d][1,4--benzodiazepine-4,7(6H)-dione*

A mixture of 0.7 g. (0.00227 mole) of 7-chloro-1-methyl - 3 - methoxy - 5 - phenyl - 3H-1,4-benzodiazepin-2(1H)-one [S. C. Bell et al., J. Med. Chem., 11, 457 (1968)] and 10 g. of diketene was heated at 96° C. for 1.5 hours to give 130 mg. of 11-chloro-8,12b-dihydro-6-methoxy-2,8 - dimethyl - 12b - phenyl - 4H - [1,3] oxazino-[3,2 - d][1,4]benzodiazepine - 4,7(6H) - dione of melting point 158–160° C.

U.V.: λ max. 244 (18,500).

*Analysis.*—Calcd. for $C_{21}H_{19}ClN_2O_4$ (percent): C, 63.24; H, 4.80; Cl, 8.89; N, 7.03. Found (percent): C, 63.21; H, 5.16; Cl, 8.86; N, 6.61.

EXAMPLE 24

*11 - chloro - 8,12b - dihydro - 2 - methyl-12b-phenyl-4H-[1,3]oxazino[3,2 - d][1,4]benzodiazepine - 4,7(6H)-dione*

A mixture of 0.675 g. (2.5 mmoles) of 7-chloro-5-phenyl - 3H - 1,4 - benzodiazepin - 2(1H)-one and 10 g. of diketene was heated on the steam bath for 1 hour to give 0.252 g. of 11 - chloro-8,12b-dihydro-2-methyl-12b-phenyl - 4H - [1,3]oxazino[3,2-d][1,4]benzodiazepine-4,7(6H)-dione of melting point 173° C. with effervescence.

U.V.: λ max. 204 (35,850); 243 (17,800); sh. 290 (1650); sh. 305 (663).

*Analysis.*—Calcd. for $C_{19}H_{15}ClN_2O_3$ (percent): C, 64.32; H, 4.26; Cl, 9.99; N, 7.90. Found (percent): C, 64.79; H, 4.90; Cl, 9.81; N, 7.37.

EXAMPLE 25

*11-chloro-12b-(o-fluorophenyl)-8,12b-dihydro - 2,8 - dimethyl-4H-[1,3]oxazino[3,2 - d][1,4]benzodiazepine-4,7(6H)-dione*

In the manner given in Example 2, but in the absence of solvent, 0.85 g. of 7-chloro-1,3-dihydro-5 - (o - fluorophenyl)-1-methyl-2H-1,4-benzodiazepin-2-one was treated with 10 g. of diketene on the steam bath under nitrogen for 2 hours to give 0.32 g. (30%) of 11-chloro-12b-(o-fluorophenyl)-8,12b-dihydro-2,8-dimethyl-4H - [1,3]oxazino[3,2-d][1,4]benzodiazepine-4,7(6H)-dione of melting point 175–177° C.

U.V.: (Ethanol): 203 (38,550): sl. sh. 228 (18,000); 238 (17,850); sl. sh. 263 (7,000); sh. 269 (4,600).

*Analysis.*—Calcd. for $C_{20}H_{16}ClFN_2O_3$ (percent): C, 62.10; H, 4.17; N, 7.24; Cl, 9.16; F, 4.91. Found (percent): C, 62.01; H, 4.71; N, 7.14; Cl, 9.17; F, 4.54.

EXAMPLE 26

*11-chloro-8,12b-dihydro-2,8-dimethyl - 12b - (o - chlorophenyl)-4H-[1,3]oxazino[3,2 - d][1,4]benzodiazepine-4,7(6H)-dione*

In the manner given in Example 2, but in the absence of solvent, 0.80 g. of 7-chloro-5-(o-chlorophenyl)-1,3-dihydro-1-methyl-2H-1,4-benzodiazepin-2 - one was reacted with 10 g. of diketene on the steam bath under nitrogen for 19 hours to give 11-chloro-8,12b-dihydro-2,8-dimethyl-12b-(o-chlorophenyl) - 4H - [1,3]oxazino[3,2 - d][1,4] benzodiazepine-4,7(6H)-dione.

In the manner given in the preceding examples, other oxazinobenzodiazepinones of Formula II can be prepared from the corresponding benzodiazepinones by treating such benzodiazepinones with a diketene or a diketene-producing reagent (acylhalide and triethylamine). Representative compounds of this type include:

11-chloro-8,12b-dihydro-2-pentyl-3-butyl-12b-phenyl-4H-[1,3]oxazino[3,2-d][1,4]benzodiazepine-4,7(6H)-dione;

9-methoxy-11-diode-8,12b-dihydro-2-heptyl-3-hexyl-12b-(3,4-dimethylphenyl)-4H-[1,3]oxazino[3,2-d][1,4]benzodiazepine-4,7(6H)-dione;

12-chloro-8,12b-dihydro-2-methyl-8-propyl-12b-phenyl-4H-[1,3]oxazino[3,2-d][1,4]benzodiazepine-4,7(6H)-dione;

10-trifluoromethyl-8,12b-dihydro-2,8-dimethyl-12b-(p-bromophenyl)-4H-[1,3]oxazino[3,2-d][1,4]benzodiazepine-4,7(6H)-dione;

9-bromo-8,12b-dihydro-2,8-diethyl-3-methyl-12b-(p-tolyl)-4H[1,3]oxazino[3,2-d][1,4]benzodiazepine-4,7(6H)-dione;

10-nitro-8,12b-dihydro-2-propyl-3-ethyl-12b-phenyl-4H-[1,3]oxazino[3,2-d][1,4]benzodiazepine-4,7(6H)-dione;

11-nitro-8,12b-dihydro-2,8-dibutyl-3-propyl-12b-(p-trifluoromethylphenyl)-4H-[1,3]oxazino[3,2-d][1,4]benzodiazepine-4,7(6H)-dione;

9-methyl-10-nitro-8,12b-dihydro-2-methyl-8-benzyl-12b-3,4-(diethoxyphenyl)-4H-[1,3]oxazino[3,2-d][1,4]benzodiazepine-4,7(6H)-dione;

12-bromo-9-butoxy-8,12b-dihydro-2-hexyl-3-pentyl-8-benzyl-12b-(p-chlorophenyl)-4H-[1,3]oxazino[3,2-d][1,4]benzodiazepine-4,7(6H)-dione;

11-chloro-12-nitro-8,12b-dihydro-6-methoxy-2-methyl-12b-(m-bromophenyl)-4H-[1,3]oxazino[3,2-d][1,4]benzodiazepine-4,7(6H)-dione;

11-bromo-8,12b-dihydro-6-ethoxy-2-propyl-3-ethyl-8-benzyl-12b-(p-chlorophenyl)-4H-[1,3]oxazino[3,2-d][1,4]benzodiazepine-4,7(6H)-dione;

9-methyl-8,12b-dihydro-2,6,8-triethyl-3-methyl-12b-(p-iodophenyl)-4H-[1,3]oxazino[3,2-d][1,4]benzodiazepine-4,7(6H)-dione;

10-cyano-8,12b-dihydro-2-methyl-6,8-dibutyl-12b-phenyl-4H-[1,3]oxazino[3,2-d][1,4]benzodiazepin-4(6H)-one-7-thione;

9-cyano-8,12b-dihydro-2-butyl-3-propyl-8-benzyl-12b-(m-butylphenyl)-4H-[1,3]oxazino[3,2-d][1,4]benzodiazepine-4(6H)-one-7-thione;

11-fluoro-8,12b-dihydro-2-pentyl-3-butyl-8-methyl-12b-(m-trifluoromethylphenyl)-4H-[1,3]oxazino[3,2-d][1,4]benzodiazepin-4(6H)-one-7-thione, and the like.

I claim:
1. An oxazinobenzodiazepine of the Formula II:

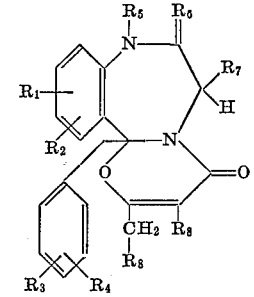

wherein $R_1$, $R_2$, $R_3$ and $R_4$ are selected from the group consisting of hydrogen, alkyl of 1 to 6 atoms, inclusive, alkoxy of 1 to 6 carbon atoms, inclusive, halogen, —$CF_3$, —$NO_2$ and —CN; wherein $R_5$ is selected from the group consisting of hydrogen, alkyl defined as above, and benzyl; wherein $R_6$ is selected from the group consisting of =O and =S; wherein $R_7$ is selected from the group consisting of hydrogen, alkyl defined as above, and alkoxy defined as above; and wherein $R_8$ is selected from the group consisting of hydrogen, alkyl defined as above, and phenyl.

2. The compound of claim 1 wherein $R_1$ is 11-chloro, $R_2$, $R_3$, $R_4$, $R_7$ and $R_8$ are hydrogen, $R_5$ is methyl and $R_6$ is oxygen, and the compound is thus 11-chloro-8,12b-dihydro-2,8-dimethyl-12b-phenyl-4H-[1,3]oxazino[3,2 - d][1,4]benzodiazepine-4,7(6H)-dione.

3. The compound of claim 1 wherein $R_1$ is 11-chloro-, $R_2$, $R_3$, $R_4$ and $R_7$ are hydrogen, $R_5$ is methyl, $R_6$ is oxygen and $R_8$ is phenyl, and the compound is thus 11-chloro-8,12b-dihydro-2-benzyl-3,12b-diphenyl-8-methyl-4H - [1,3]oxazino[3,2-d][1,4]benzodiazepine-4,7(6H)-dione.

4. The compound of claim 1 wherein $R_1$ is 11-chloro-, $R_2$, $R_3$, $R_4$, $R_5$, $R_7$ and $R_8$ are hydrogen and $R_6$ is oxygen, and the compound is thus 11-chloro-8,12b-dihydro-2-methyl-12b-phenyl-4H-[1,3]oxazino - [3,2 - d][1,4]benzodiazepine-4,7(6H)-dione.

5. The compound of claim 1 wherein $R_1$ is 11-trifluoromethyl, $R_2$, $R_3$, $R_4$, $R_7$ and $R_8$ are hydrogen, $R_5$ is methyl and $R_6$ is oxygen, and the compound is thus 11-trifluoromethyl-8,12b-dihydro-2,8-dimethyl-12b-phenyl-4H - [1,3]oxazino[3,2-d][1,4]benzodiazepine-4,7(6H)-dione.

6. The compound of claim 1 wherein $R_1$ is 11-chloro-, $R_4$ is p-chloro, $R_2$, $R_3$, $R_7$ and $R_8$ are hydrogen, $R_5$ is methyl and $R_6$ is oxygen, and the compound is thus 11-chloro-8,12b-dihydro-2,8-dimethyl - 12b - (p - chlorophenyl)-4H - [1,3]oxazino[3,2 - d][1,4]benzodiazepine-4,7(6H)-dione.

7. The compound of claim 1 wherein $R_1$ is 11-chloro-, $R_2$, $R_3$, $R_4$, $R_7$ and $R_8$ are hydrogen, $R_5$ is methyl and $R_6$ is sulfur, and the compound is thus 11-chloro-8,12b-dihydro-2,8-dimethyl-12b-phenyl-4H-[1,3]oxazino[3,2 - d][1,4]benzodiazepin-4(6H)-one-7-thione.

8. The compound of claim 1 wherein $R_1$ is 11-cyano, $R_2$, $R_3$, $R_4$, $R_7$ and $R_8$ are hydrogen, $R_5$ is methyl and $R_6$ is oxygen, and the compound is thus 11-cyano-8,12b-dihydro-2,8-dimethyl-12b-phenyl-4H-[1,3]oxazino[3,2 - d][1,4]-benzodiazepine-4,7(6H)-dione.

9. The compound of claim 1 wherein $R_1$ is 11-chloro, $R_2$, $R_3$, $R_4$ and $R_7$ are hydrogen, $R_5$ is methyl, $R_6$ is oxygen and $R_8$ is ethyl, and the compound is thus 11-chloro-8,12b - dihydro - 3-ethyl-8-methyl-2-propyl-12b-phenyl - 4H - [1,3]oxazino[3,2-d][1,4]benzodiazepine-4,7(6H)-dione.

10. The compound of claim 1 wherein $R_1$ is 11-chloro, $R_2$, $R_3$, $R_4$ and $R_7$ are hydrogen, $R_5$ and $R_8$ are methyl and $R_6$ is oxygen, and the compound is thus 11-chloro-8,12b-dihydro-2-ethyl-3,8-dimethyl - 12b - phenyl - 4H-[1,3]oxazino[3,2-d][1,4]benzodiazepine - 4,7(6H) - dione.

11. The compound of claim 1 wherein $R_1$, $R_2$, $R_3$, $R_4$, $R_7$ and $R_8$ are hydrogen, $R_5$ is methyl and $R_6$ is oxygen, and the compound is thus 8,12b-dihydro-2,8 - dimethyl-12b-phenyl - 4H - [1,3]oxazino[3,2-d][1,4]-benzodiazepine-4,7(6H)-dione.

12. The compound of claim 1 wherein $R_1$ is 11-nitro, $R_2$, $R_4$, $R_7$ and $R_8$ are hydrogen, $R_3$ is o-fluoro, $R_5$ is methyl and $R_6$ is oxygen, and the compound is thus 11-nitro-8,12b-dihydro-2,8-dimethyl-12b - (o-fluorophenyl)-4H - [1,3]oxazino[3,2-d][1,4]benzodiazepine - 4,7(6H)-dione.

13. The compound of claim 1 wherein $R_1$ is 11-nitro, $R_2$, $R_3$, $R_4$, $R_7$ and $R_8$ are hydrogen, $R_5$ is methyl, $R_6$ is oxygen and $R_8$ is phenyl, and the compound is thus 11-nitro-8,12b-dihydro - 2,8-dimethyl-12b-phenyl-4H-[1,3]-oxazino[3,2-d][1,4]-benzodiazepine-4,7(6H)-dione.

14. The compound of claim 1 wherein $R_1$ is 11-chloro, $R_2$, $R_3$, $R_4$, and $R_7$ are hydrogen, $R_5$ is methyl and $R_6$ is oxygen, $R_8$ is isopropyl and the compound is thus 11-chloro-8,12b-dihydro-2-isobutyl-3-isopropyl - 8 - methyl-12b-phenyl - 4H-[1,3]oxazino[3,2-d][1,4]benzodiazepine-4,7(6H)-dione.

15. The compound of claim 1 wherein $R_1$ is 11-chloro, $R_2$, $R_3$, $R_4$ and $R_8$ are hydrogen, $R_5$ is methyl and $R_6$ is oxygen, and $R_7$ is methoxy, and the compound is thus 11-chloro - 8,12-b-dihydro - 6-methoxy-2,8-dimethyl-12b - phenyl-4H-[1,3]oxazino[3,2-d][1,4]benzodiazepine-4,7(6H)-dione.

16. The compound of claim 1 wherein $R_1$ is 11-fluoro, $R_2$, $R_3$, $R_4$, and $R_7$ are hydrogen, $R_5$ and $R_8$ are methyl, and $R_6$ is oxygen, and the compound is thus 11-fluoro-8,12b-dihydro-2-ethyl - 3,8 - dimethyl - 12b-phenyl-4H-[1,3]oxazino[3,2-d][1,4]benzodiazepine - 4,7(6H) - dione.

17. The compound of claim 1 wherein $R_1$ is 11-chloro, $R_2$, $R_3$, $R_7$ and $R_8$ are hydrogen, $R_4$ is o-fluoro, $R_5$ is methyl and $R_6$ is oxygen and the compound is thus 11-chloro - 8,12b - dihydro - 2,8 - dimethyl-12b-(o-fluorophenyl) - 4H - [1,3]oxazino[3,2-d][1,4]benzodiazepine-4,7(6H)-dione.

18. The compound of claim 1 wherein $R_1$ is 11-chloro, $R_2$, $R_3$, $R_7$ and $R_8$ are hydrogen, $R_4$ is o-chloro, $R_5$ is methyl and $R_6$ is oxygen, and the compound is thus 11-chloro-8,12b-dihydro-2,8 - dimethyl - 12b - (o-chlorophenyl) - 4H - [1,3]oxazino[3,2-d][1,4]benzodiazepine-4,7(6H)-dione.

19. 11 - chloro - 8 - (cyclopropylmethyl)-8,12b-dihydro-2 - methyl - 12b - phenyl-4H-[1,3]oxazino-[3,2-d]-[1,4]-benzodiazepine-4,7(6H)-dione.

20. A process for the production of an oxazinobenzodiazepine of the Formula 11:

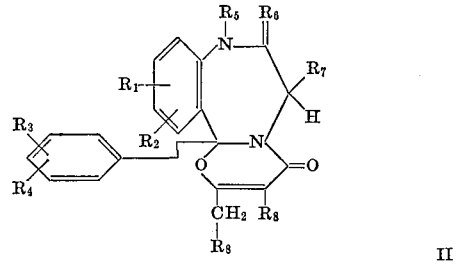

wherein $R_1$, $R_2$, $R_3$ and $R_4$ are selected from the group consisting of hydrogen, alkyl of 1 to 6 carbon atoms, inclusive alkoxy of 1 to 6 carbon atoms, inclusive, halogen, —$CF_3$, —$NO_2$ and —CN; wherein $R_5$ is selected from the group consisting of hydrogen and alkyl defined as above, and benzyl; wherein $R_6$ is selected from the group consisting of =O and =S; wherein $R_7$ is selected from the group consisting of hydrogen, alkyl defined as above, and alkoxy as defined above; and wherein $R_8$ is selected from the group consisting of hydrogen, alkyl defined as above, and phenyl, which comprises: treating, in an inert organic solvent, a 5 - phenyl-3H-1,4-benzodiazepin-2(1H)-one of the Formula 1:

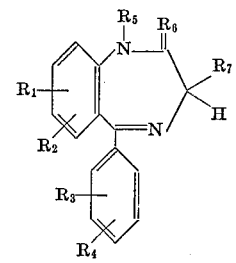

wherein $R_1$, $R_2$, $R_3$, $R_4$, $R_5$, $R_6$ and $R_7$ are defined as above, with a diketene of the formula

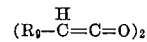

wherein $R_9$ is selected from the group consisting of hydrogen, alkyl of 1 to 6 carbon atoms, inclusive, and phenyl.

21. The process of claim 20 wherein 7-chloro-1-methyl-5-phenyl-3H-1,4 - benzodiazepin - 2(1H) - one is reacted with diketene in acetone to give 11-chloro-8,12b-dihydro-2,8-dimethyl - 12b - phenyl - 4H - [1,3]oxazino[3,2-d]-[1,4]benzodiazepine-4,7(6H)-dione.

22. The process of claim 20 wherein a diketene is produced in situ by the reaction of an acyl halide selected from the group consisting of chlorides and bromides of alkanoic acids of 2 to 8 carbon atoms, inclusive, and phenylsubstituted alkanoic acids of 8 to 10 carbon atoms, inclusive, which have at least two hydrogen atoms in the 2-position, in the presence of an acid acceptor.

23. The process of claim 22 wherein the acyl halide is acetyl chloride.

24. The process of claim 22 wherein the acyl halide is phenylacetyl chloride.

25. The process of claim 23 wherein 7-chloro-1-methyl-5-phenyl-3H-1,4-benzodiazepin - 2(1H) - one is reacted with acetyl chloride and triethylamine in ether to give 11-chloro-8,12b-dihydro-2,8-dimethyl-12b - phenyl - 4H-[1,3]oxazino[3,2-d][1,4] - benzodiazepine - 4,7(6H)-dione.

References Cited
UNITED STATES PATENTS 3,483,187  12/1969  Doebel et al.

HENRY R. JILES, Primary Examiner

R. T. BOND, Assistant Examiner

U.S. Cl. X.R.

424—248

UNITED STATES PATENT OFFICE
CERTIFICATE OF CORRECTION

Patent No. 3,573,282                Dated   June 21, 1971

Inventor(s) Jacob Szmuszkovicz

It is certified that error appears in the above-identified patent and that said Letters Patent are hereby corrected as shown below:

Column 3, line 24, for "85 m./kg." read -- 85 mg/kg --. Column 4, line 47, for "1methyl" read -- 1-methyl--. Column line 18, for "(p-chlorophenyl-" read -- (p-chlorophenyl)- --; line 28, for "100 C." read -- 100° C. --; line 45, for "sh 23 read -- sh 243 --. Column 8, line 24, for "benzodiazepin-" r -- benzodiazepine- --; line 35, for "$C_{24}H_{25}Cl_2O_3$:" read -- $C_{24}H_{25}ClN_2O_3$: --. Column 9, line 10, for "benzodiazepin-" re -- benzodiazepine- --; line 38, for "-4h-" read -- -4H- --. Column 10, line 6, for "[3,2-d[]1,4]" read -- |3,2-d][1,4] -- line 58, for "$C_{23}H_{21}ClN_2O_3$:" read -- $C_{26}H_{29}ClN_2O_3$: --; line 60 for "Cl, 7.5" read -- Cl, 7.75 --. Column 11, line 4, for "$C_{12}H_{21}ClN_2O_3$:" read -- $C_{23}H_{21}ClN_2O_3$: --; line 10, for "[1,4 read -- [1,4]ben --. Column 12, line 7, for "11-diode" read - 11-iodo --; line 29, for "(p-chlorophenyl)" read -- (p-propylp --. Column 14, line 22, for "formula 11" read -- formula II line 46, for "formula 1" read -- formula I --.

Signed and sealed this 16th day of November 1971.

(SEAL)
Attest:

EDWARD M. FLETCHER, JR.          ROBERT GOTTSCHALK
Attesting Officer                Acting Commissioner of Patents